(12) United States Patent
Leighty et al.

(10) Patent No.: US 11,156,231 B2
(45) Date of Patent: Oct. 26, 2021

(54) MULTISTAGE COMPRESSOR HAVING INTERSTAGE REFRIGERANT PATH SPLIT BETWEEN FIRST PORTION FLOWING TO END OF SHAFT AND SECOND PORTION FOLLOWING AROUND THRUST BEARING DISC

(71) Applicant: HONEYWELL INTERNATIONAL INC., Morris Plains, NJ (US)

(72) Inventors: Michael Leighty, Westminster, CA (US); Dennis Mikio Morita, Rancho Palos Verdes, CA (US); Stephen L White, Whittier, CA (US)

(73) Assignee: Honeywell International Inc., Charlotte, NC (US)

(*) Notice: Subject to any disclaimer, the term of this patent is extended or adjusted under 35 U.S.C. 154(b) by 387 days.

(21) Appl. No.: 15/934,652

(22) Filed: Mar. 23, 2018

(65) Prior Publication Data

US 2019/0293088 A1    Sep. 26, 2019

(51) Int. Cl.
| | | |
|---|---|---|
| *F04D 29/58* | (2006.01) | |
| *F04D 17/12* | (2006.01) | |
| *F25B 31/00* | (2006.01) | |
| *F25B 1/04* | (2006.01) | |
| *F04D 29/057* | (2006.01) | |
| *B64D 13/06* | (2006.01) | |

(52) U.S. Cl.
CPC ......... *F04D 29/584* (2013.01); *F04D 17/122* (2013.01); *F04D 29/5806* (2013.01); *F25B 1/04* (2013.01); *F25B 31/008* (2013.01); *B64D 2013/0674* (2013.01); *F04D 29/057* (2013.01)

(58) Field of Classification Search
CPC ............. H02K 9/08; H02K 9/14; H02K 9/16; H02K 9/18; F04D 25/0606; F04D 25/0646; F04D 25/064; F04D 29/051; F04D 29/582; F04D 29/584; F04D 17/122; F04D 29/5806; F04D 29/057; F25B 31/006; F25B 31/008; F25B 1/04; B64D 2013/0674
USPC ............ 417/366; 310/54, 56, 57, 58, 59, 64, 310/60 A, 61
See application file for complete search history.

(56) References Cited

U.S. PATENT DOCUMENTS

| | | | |
|---|---|---|---|
| 2,249,882 A * | 7/1941 | Buchanan | F25B 31/006 62/505 |
| 2,746,269 A | 5/1956 | Moody | |
| 2,793,506 A | 5/1957 | Moody | |
| 3,022,638 A | 2/1962 | Caswell et al. | |
| 3,122,894 A * | 3/1964 | Bernhard | H02K 9/20 62/117 |
| 3,188,833 A * | 6/1965 | Robinson | H02K 9/20 62/505 |

(Continued)

*Primary Examiner* — Patrick Hamo
*Assistant Examiner* — Benjamin Doyle
(74) *Attorney, Agent, or Firm* — Shumaker & Sieffert, P.A.

(57) ABSTRACT

A vapor cycle compressor includes a motor section and a compression section operatively engaged with the motor section. A refrigerant path is in the motor section and in the compression section. The refrigerant path includes: a compression refrigerant path, for a single phase compression refrigerant, in the compression section; an inner rotor shaft refrigerant path, for a single phase inner rotor shaft refrigerant, in the compression section and in the motor section; and a stator refrigerant path, for a two phase stator refrigerant, in the motor section.

18 Claims, 7 Drawing Sheets

(56) References Cited

U.S. PATENT DOCUMENTS

| | | | | |
|---|---|---|---|---|
| 3,218,825 A * | 11/1965 | McClure | ............... | F25B 31/008 62/505 |
| 3,241,331 A * | 3/1966 | Endress | ................ | F25B 31/008 62/117 |
| 3,388,559 A * | 6/1968 | Johnson | ................... | H02K 9/20 62/224 |
| 3,479,541 A * | 11/1969 | Robinson | ................. | H02K 9/20 310/54 |
| 3,975,117 A * | 8/1976 | Carter | ....................... | F04D 1/06 417/370 |
| 4,182,137 A * | 1/1980 | Erth | ......................... | H02K 1/20 310/61 |
| 4,903,497 A * | 2/1990 | Zimmern | ................ | F04C 29/045 62/113 |
| 5,350,039 A * | 9/1994 | Voss | ........................ | F04D 25/06 184/104.1 |
| 5,591,016 A * | 1/1997 | Kubota | ................. | F04D 29/061 415/104 |
| 5,797,731 A * | 8/1998 | Kobayashi | ............. | F04D 13/14 417/238 |
| 6,116,040 A | 9/2000 | Stark | | |
| 6,375,438 B1 * | 4/2002 | Seo | ......................... | F04D 17/12 415/111 |
| 6,390,789 B1 * | 5/2002 | Grob | ....................... | F04D 17/12 417/251 |
| 6,460,371 B2 | 10/2002 | Kawada | | |
| 6,631,617 B1 * | 10/2003 | Dreiman | ............... | F04C 23/001 417/295 |
| 6,675,594 B2 | 1/2004 | Choi et al. | | |
| 6,874,329 B2 | 4/2005 | Stark et al. | | |
| 6,897,581 B2 * | 5/2005 | Doherty | ................... | H02K 1/24 310/52 |
| 6,997,686 B2 * | 2/2006 | Agrawal | ................ | F04D 17/12 417/250 |
| 7,003,971 B2 | 2/2006 | Kester et al. | | |
| RE39,597 E | 5/2007 | Rousseau | | |
| 7,633,193 B2 * | 12/2009 | Masoudipour | ...... | F04D 29/5806 310/54 |
| 7,704,056 B2 * | 4/2010 | Masoudipour | ........ | F04D 17/122 417/372 |
| 7,922,466 B2 * | 4/2011 | Radermacher | ...... | F04D 29/4206 415/108 |
| 8,931,304 B2 * | 1/2015 | Beers | ..................... | F04D 25/06 62/510 |
| 8,959,950 B2 * | 2/2015 | Doty | ..................... | F04D 29/284 417/366 |
| 9,194,619 B2 | 11/2015 | Margotti et al. | | |
| 9,382,911 B2 * | 7/2016 | Sun | ..................... | F04D 27/0238 |
| 9,395,106 B2 | 7/2016 | Voorhis | | |
| 9,395,111 B2 | 7/2016 | Sommer et al. | | |
| 9,476,428 B2 * | 10/2016 | Agrawal | .................. | H02K 1/32 |
| 9,494,158 B2 | 11/2016 | Pham et al. | | |
| 9,664,200 B2 | 5/2017 | Oda et al. | | |
| 9,671,139 B2 * | 6/2017 | Creamer | ............... | F25B 29/003 |
| 9,822,998 B2 * | 11/2017 | Knopp | .................... | F25B 31/008 |
| 9,903,374 B2 * | 2/2018 | Kosamana | ........... | F04D 29/624 |
| 10,036,582 B2 * | 7/2018 | Thornton | .............. | F25B 31/006 |
| 2004/0179947 A1 * | 9/2004 | Agrawal | .................. | F04D 17/12 417/212 |
| 2005/0235672 A1 * | 10/2005 | Hsu | ......................... | H02K 5/20 62/259.2 |
| 2007/0212232 A1 * | 9/2007 | De Larminat | .......... | F04D 25/06 417/83 |
| 2007/0269323 A1 * | 11/2007 | Zhou | ..................... | F04D 29/584 417/423.7 |
| 2008/0098768 A1 * | 5/2008 | Masoudipour | ........ | F25B 31/006 62/505 |
| 2008/0168796 A1 * | 7/2008 | Masoudipour | ........... | H02K 9/19 62/505 |
| 2008/0199326 A1 * | 8/2008 | Masoudipour | ........ | F04D 29/584 417/247 |
| 2009/0044548 A1 * | 2/2009 | Masoudipour | ........ | F04D 17/122 62/115 |
| 2009/0229280 A1 * | 9/2009 | Doty | .................... | F04D 29/284 62/115 |
| 2010/0006262 A1 * | 1/2010 | Welch | ................... | F25B 31/006 165/104.11 |
| 2014/0345311 A1 | 11/2014 | Sunt et al. | | |
| 2015/0300708 A1 | 10/2015 | Kennedy | | |
| 2015/0308456 A1 * | 10/2015 | Thompson | .......... | F04D 29/5806 417/244 |
| 2016/0128241 A1 | 5/2016 | Broglia | | |
| 2016/0245559 A1 * | 8/2016 | Yang | ..................... | F25B 31/008 |
| 2017/0127566 A1 | 5/2017 | Imura et al. | | |
| 2017/0131006 A1 | 5/2017 | Thornton et al. | | |
| 2017/0268806 A1 * | 9/2017 | Knopp | .................... | H02K 1/20 |
| 2019/0178255 A1 | 6/2019 | Leighty et al. | | |
| 2019/0178259 A1 | 6/2019 | McCabe et al. | | |

\* cited by examiner

MULTISTAGE COMPRESSOR HAVING INTERSTAGE REFRIGERANT PATH SPLIT BETWEEN FIRST PORTION FLOWING TO END OF SHAFT AND SECOND PORTION FOLLOWING AROUND THRUST BEARING DISC

BACKGROUND OF THE INVENTION

The present invention generally relates to vapor cycle compressors and, more particularly, to apparatus and methods of cooling associated components of vapor cycle compressors.

Applications that require high power devices such as motors, compressors, fans, pumps, etc. produce large amounts of heat due to electrical losses. The heat generated is even greater when the controller losses are taken into account. In a typical aerospace application, the generated heat is conducted away by an independent fluid circuit at a high pressure and flow rate, and then dissipated to a lower temperature heat sink. However, the foregoing increases the complexity of a system and adds additional weight in the form of fluid and infrastructure.

The concerns of weight and complexity are greater when system components are integrated into a single package. The concerns are further exacerbated when multiple fluids are used for heat transfer.

As can be seen, there is a need for improved apparatus and methods to cool integrated components of a vapor cycle compressor.

SUMMARY OF THE INVENTION

In one aspect of the present invention, a vapor cycle compressor comprises a motor section; a compression section operatively engaged with the motor section; and a refrigerant path in the motor section and in the compression section; wherein the refrigerant path includes: a compression refrigerant path for a single phase compression refrigerant in the compression section; an inner rotor shaft refrigerant path for a single phase refrigerant extending through the compressor section and into the motor section; a stator refrigerant path for a two phase stator refrigerant in the motor section.

In another aspect of the present invention, a vapor cycle compressor comprises a compression refrigerant path, for a first gas refrigerant, in a compression section of the compressor; an inner rotor shaft refrigerant path, for a second gas refrigerant, along an inner rotor shaft of the compressor; a stator refrigerant path, for a gas and liquid refrigerant, in a motor section of the compressor.

In a further aspect of the present invention, a vapor cycle compressor comprises a compression refrigerant path, for a gas refrigerant, in a compression section of the compressor; an inner rotor shaft refrigerant path, for the gas refrigerant, about an inner rotor shaft of the compressor; wherein an outlet of the inner rotor shaft refrigerant path is in communication with the compression refrigerant path; a stator refrigerant path, for a two phase refrigerant, about a stator of the compressor.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides components of a vapor cycle compressor into a single package. A two-stage centrifugal compressor is directly driven by a high-speed, brushless, permanent-magnet (PM) motor and a physically integrated motor controller. The stator drives a samarium-cobalt, high-speed permanent magnet rotor. The motor design can be coordinated with the controller design to optimize drive electronics topology. The controller electronics are integrated onto the compressor housing.

The drive motor can utilize a small amount of refrigerant vapor from a first stage outlet to cool rotor and bearings by circulating the vapor through the motor cavity and returning it to the first stage inlet.

Both the motor and the controller electronics are cooled by a high pressure, high flow, two-phase refrigerant flowing through an internal cooling sleeve. The quality of the two-phase refrigerant changes as it cools the motor stator and power electronics. This vapor/liquid mixture is then passed through a subcooler before returning to the compressor at the second stage inlet.

Although described in the exemplary context of an aircraft, the present invention can be used in other environments.

Figure 1A:
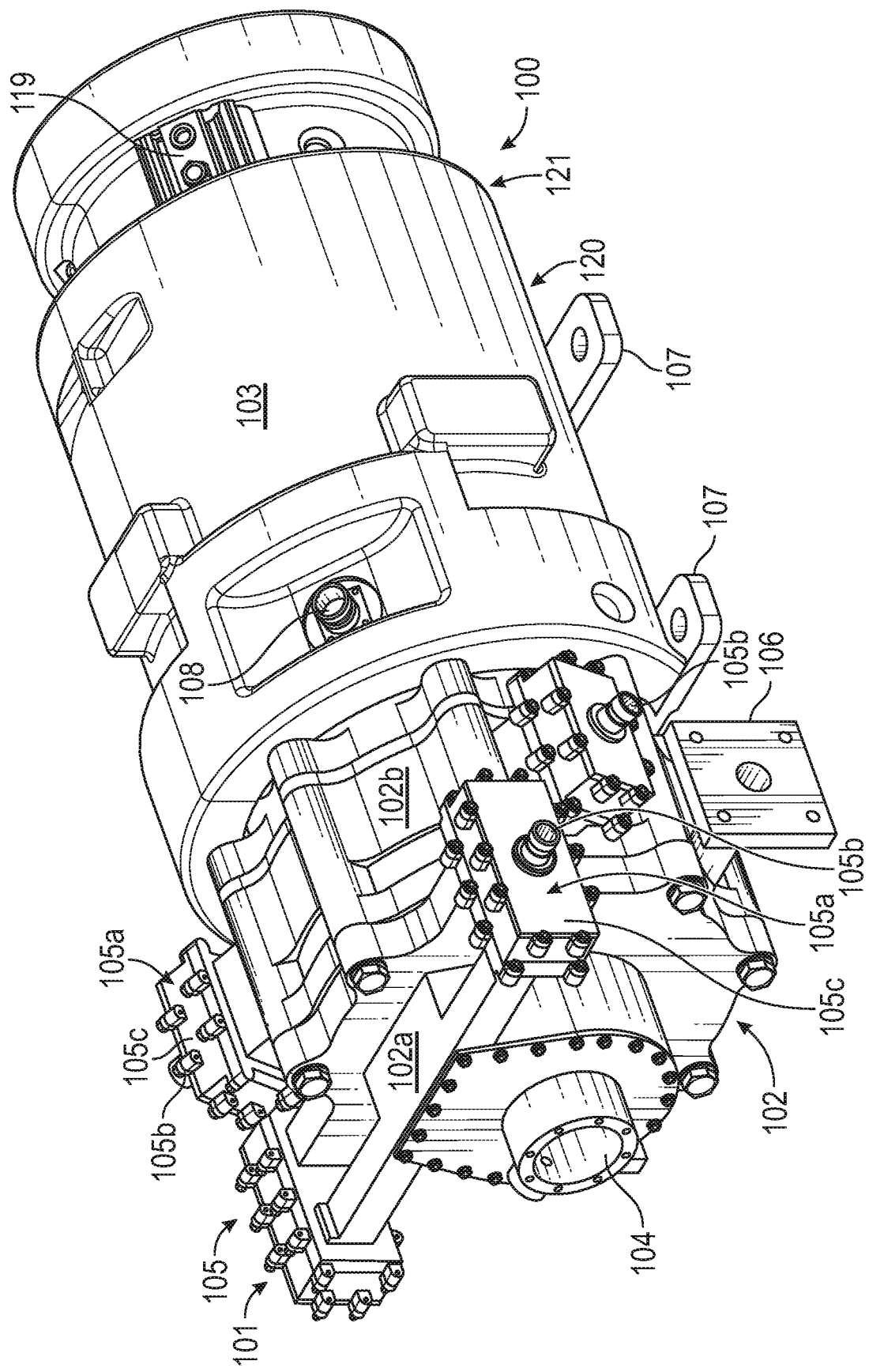
FIG. 1A is a perspective view of an exterior of a vapor cycle compressor according to an embodiment of the present invention.

In FIG. 1A, an exemplary vapor cycle compressor 100 can be affixed to a support via mountings 107. The compressor 100 may include a drive section 101, a compression section 102 operatively engaged with the drive section 101, a controller section 120 in communication with the drive section 101, and a motor section 121 operatively engaged with the compression section 102. The controller section 120 and the motor section 121 may be hermetically sealed in a cover/housing 103.

In embodiments, the drive section 101 may include a stepper motor assembly 105 that can be hermetically sealed. The stepper motor assembly 105 may drive the rotation of vanes in the compression section 102. The stepper motor assembly may include a plurality of stepper motor subassemblies 105a. One or more of the subassemblies 105a may include a stepper motor connector 105b and a stepper motor housing 105c. The stepper motor connector 105b may connect to power from a separate or internally derived source.

The compression section 102, according to embodiments, may include an inlet subsection 102a and an impeller/diffuser subsection 102b. The inlet subsection 102a may include a compressor inlet 104 configured to receive a first or single phase refrigerant (such as gas) from an evaporator, for example.

The impeller/diffuser subsection 102b, in embodiments, may include an upstream first stage impeller assembly, a downstream first stage diffuser assembly, a downstream return channel assembly, a downstream second stage impeller assembly, and a downstream second stage diffuser assembly described below and/or as described in US application "Vapor Cycle Compressor with Variable Inlet/Outlet Geometry," Ser. No. 15/889,962, filed Feb. 6, 2018 and incorporated herein in its entirety. The impeller/diffuser subsection 102b may also include a sub-cooling inlet 106 that is configured to increase cooling performance and extend compressor flow range.

Figure 1B:
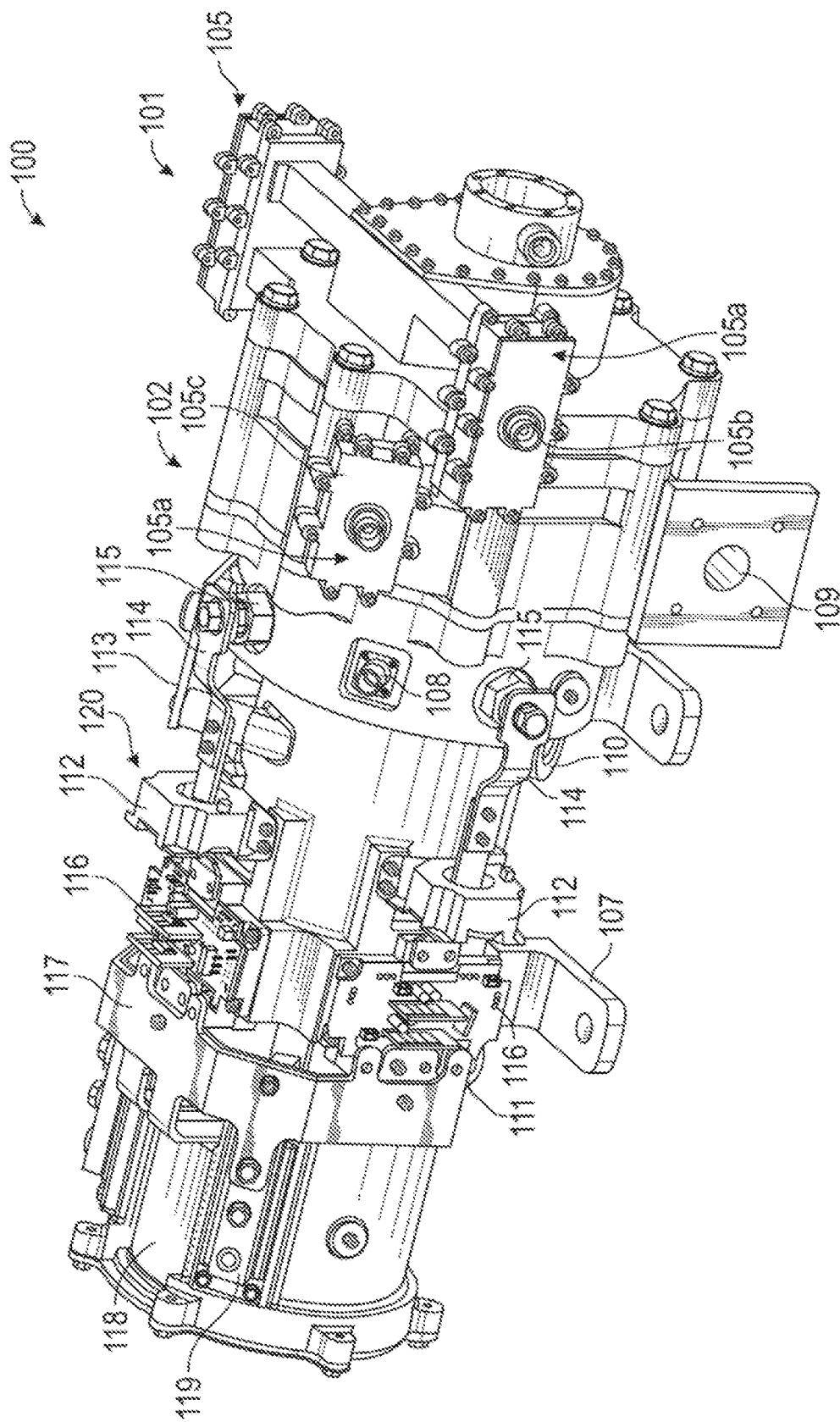
FIG. 1B is a perspective view of an interior of the vapor cycle compressor of FIG. 1A.

In FIG. 1B, according to embodiments, the controller section 120 of the compressor 100 may include a digital signal processor 113 that is configured to provide localized compressor torque and speed control which includes stepper motor function, and a high power switch module 116 that is configured to provide control of the motor section 121. A current sensor transducer 112 can be configured to measure power into the motor section 121, a motor bus bar 114 can be configured to distribute current, and a stud seal terminal 115 can be configured to pass electric current from the exterior of the compressor to the interior of the compressor. A capacitor 118 can be configured to maintain constant controller DC link voltage, capacitor bus bar 117 can be configured to supply or distribute link voltage, and a power input terminal 119 can be configured to receive power to the compressor. An electrical connector 108 may access external power. A coolant inlet 111 and coolant outlet 110 provides refrigerant to the motor section.

Figure 2A:
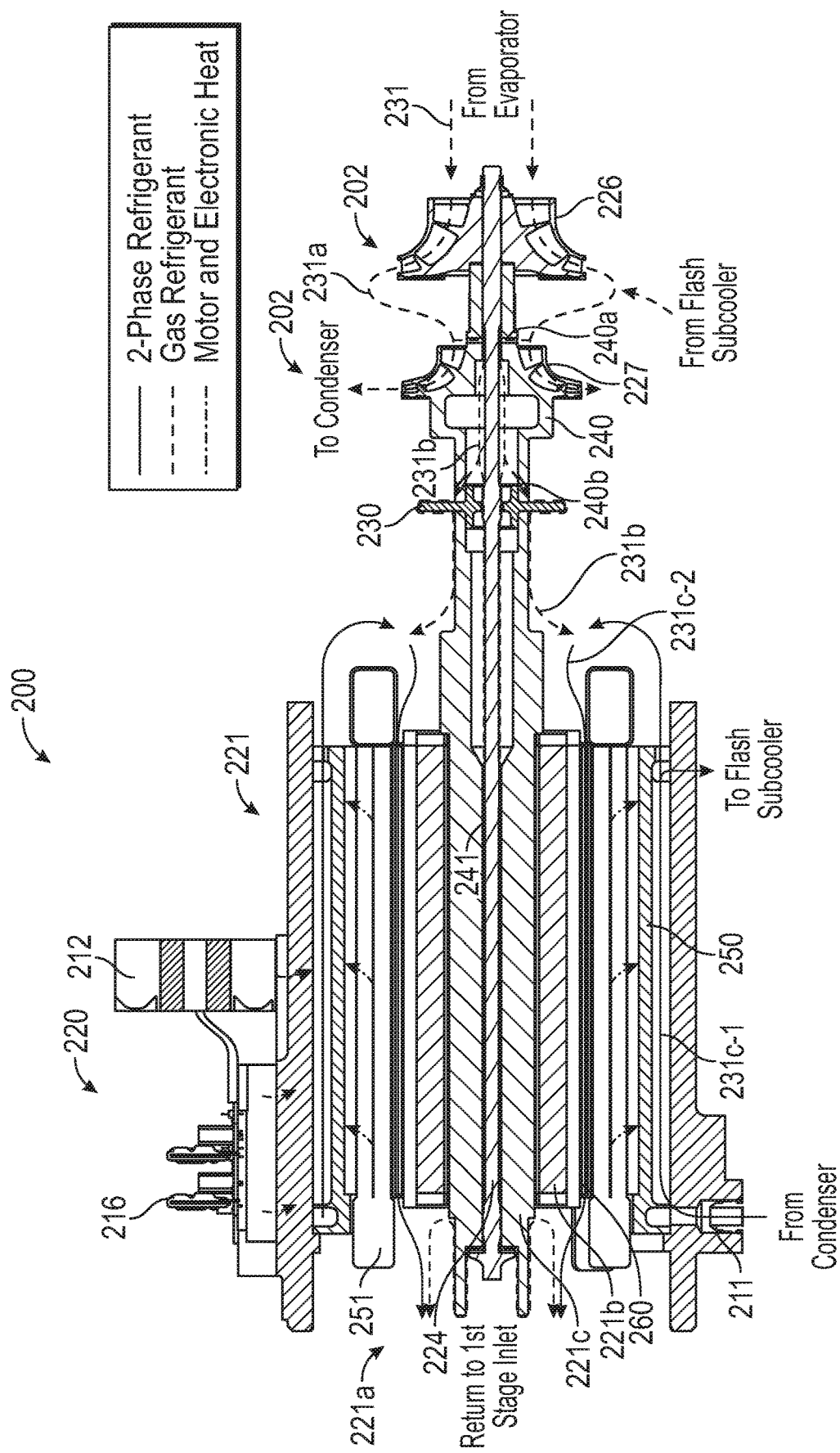
FIG. 2A is a partial, cross-sectional schematic view of a vapor cycle compressor having a refrigerant path according to an embodiment of the present invention.
Figure 2B:
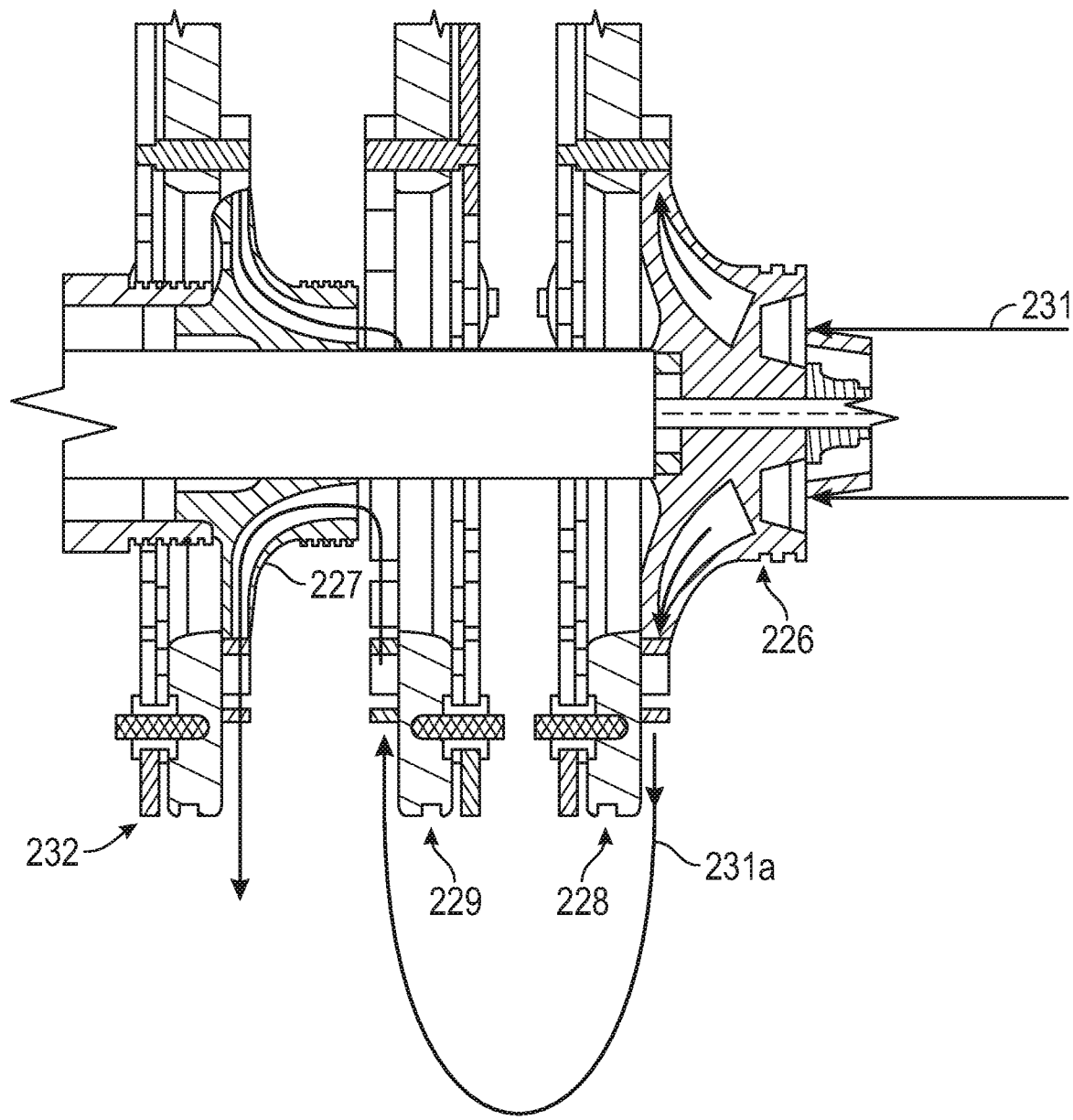
FIG. 2B is a partial, cross sectional view of a compression section of a vapor cycle compressor according to an embodiment of the present invention.

In FIG. 2A, an exemplary vapor cycle compressor 200 is partially shown and may be similar to that described in relation to FIGS. 1A-1B. In FIG. 2B, a compression section of the compressor 200 is partially shown. Accordingly, reference numbers in FIGS. 2A-2B correspond to like reference numbers in FIGS. 1A-1B.

According to embodiments, the compressor 200 may include a compression section 202 in communication with a motor section 221, both of which may be directly or indirectly controlled by a controller section 220. A compression housing (FIGS. 1A-1B) may enclose the compression section 202. A motor housing 251 may enclose the motor section 221, as well as support thereon various electronics 212, 216.

The motor section 221 may include a motor 221a having a stator 221b, and a rotor 221c. An inner rotor shaft 224 may be disposed within the rotor 221c.

The compression section 202 may include a first stage compression and a second stage compression driven by the motor rotor shaft 221c disposed within a housing 240. The first stage compression may include an upstream first stage impeller assembly 226 and a downstream first stage diffuser assembly 228 (FIG. 2B). The second stage compression may include a second stage impeller assembly 227 and a downstream second stage diffuser assembly 232 (FIG. 2B). A return channel assembly 229 (FIG. 2B) may be disposed between the first and second stages.

FIG. 2B shows each of the foregoing assemblies of the first and second compression stages.

Referring back to FIG. 2A, the compressor 200 may include a continuous refrigerant path 231 that can have a compression refrigerant path 231a, an inner rotor shaft refrigerant path 231b, and a stator refrigerant path 231c. The foregoing paths 231a, b, c may be in refrigerant communication with each other.

The compression refrigerant path 231a, in embodiments, may provide a path for a compression refrigerant in the compression section 202. In particular, the compression refrigerant path 231a may extend from and through the first stage impeller assembly 226, then the first stage diffuser assembly 228, then the return channel assembly 229, then the second stage impeller assembly 227, and then the second stage diffuser assembly 232.

In embodiments, the compression refrigerant may be a single phase refrigerant. In other embodiments, the compression refrigerant may be a first gas refrigerant. The compression refrigerant, according to embodiments, may originate from an evaporator (not shown), for example. In other embodiments, at least a portion of the compression refrigerant may originate, between the first and second compression stages, from a subcooler (not shown), for example. At least a portion of the compression refrigerant may be discharged, after the second compression stage, to a condenser (not shown).

At least another portion of the compression refrigerant, according to embodiments, may be discharged to the inner rotor shaft refrigerant path 231b. The foregoing may be achieved when the compression refrigerant path is in refrigerant communication with the inner rotor shaft refrigerant path 231b, such as via a housing inlet 240a. The housing inlet 240a may be in communication with that portion of the compression refrigerant path 231a intermediate the first and second stage impeller assemblies 226, 227, for example. Thereby, compression refrigerant from the compression refrigerant path 231a may flow into the inner rotor shaft refrigerant path 231b.

The inner rotor shaft refrigerant path 231b, in embodiments, may provide a path for an inner rotor shaft refrigerant in at least one of the compression section 202 and the motor section 221. At least a portion of the inner rotor shaft refrigerant path 231b may extend along and about the inner rotor shaft 224. In at least the motor section, the inner rotor shaft refrigerant path 231b may be disposed in a gap 241 between the inner rotor shaft 224 and the rotor 221c. In at least the compression section, another portion of the inner rotor shaft refrigerant path 231b may extend through a housing outlet 240b, about/around a thrust bearing disk 230, and into the motor housing 251. Thereby, the inner rotor shaft refrigerant path 231b can provide cooling to the inner rotor shaft 224, the thrust bearing disk 230, and adjacent components of the compressor 200.

In embodiments, the inner rotor shaft refrigerant may be a single phase refrigerant. In other embodiments, the inner rotor shaft refrigerant may be a second gas refrigerant and/or may originate from an evaporator, for example. Accordingly, in embodiments, the inner rotor shaft refrigerant can include at least a portion of the compression refrigerant. In embodiments, the inner rotor shaft refrigerant and the compression refrigerant are the same refrigerants.

At an end of the inner rotor shaft 224 opposite the compression section, the inner rotor shaft refrigerant path 231b may lead back to the compression refrigerant path 231a at the first stage compression, for example. Downstream of the thrust bearing disk 230, the inner rotor shaft refrigerant path 231b may be in refrigerant communication with the stator refrigerant path 231c.

The stator refrigerant path 231c, in embodiments, may provide a path for a stator refrigerant in the motor section 221. In embodiments, the stator refrigerant path 231c may include a stator refrigerant sub-path 231c-1 and a stator refrigerant sub-path 231c-2. A refrigerant in the stator refrigerant path 231c, and in particular the sub-path 231c-1, may originate from a condenser (not shown) and flow into the housing 251, via an inlet 211 that is opposite the compression section 202. The stator refrigerant sub-path 231c-1 may then extend along and about a cooling sleeve 250 which is disposed along and about the stator 221b. In so doing, the sub-path 231c-1 extends along and about the stator 221b and proceeds towards the compression section 202.

Near the compression section 202, and within the motor housing 251, the stator refrigerant path 231c, and in particular the stator refrigerant sub-path 231c-1, may join with the inner rotor shaft refrigerant path 231b. Thereby, the stator refrigerant path 231c is in refrigerant communication with the inner rotor shaft refrigerant path 231b.

From the above point of joinder, the stator refrigerant path 231c, and in particular the stator refrigerant sub-path 231c-2, may extend along and through a longitudinal gap 260 between the stator 221b and the rotor 221c. In embodiments, the stator refrigerant sub-path 231c-1 may additionally and/or alternatively join, in the motor housing 251, the compression refrigerant path 231a.

In embodiments, the stator refrigerant may be a two phase refrigerant. In other embodiments, the stator refrigerant may be a gas and vapor refrigerant. For example, the stator refrigerant may originate from a condenser (not shown). As a further example, the gas portion of the stator refrigerant may partly originate from the evaporator as mentioned above. Accordingly, the stator refrigerant can include at least a portion of the compression refrigerant and/or at least a portion of the inner rotor shaft refrigerant.

Figure 3:
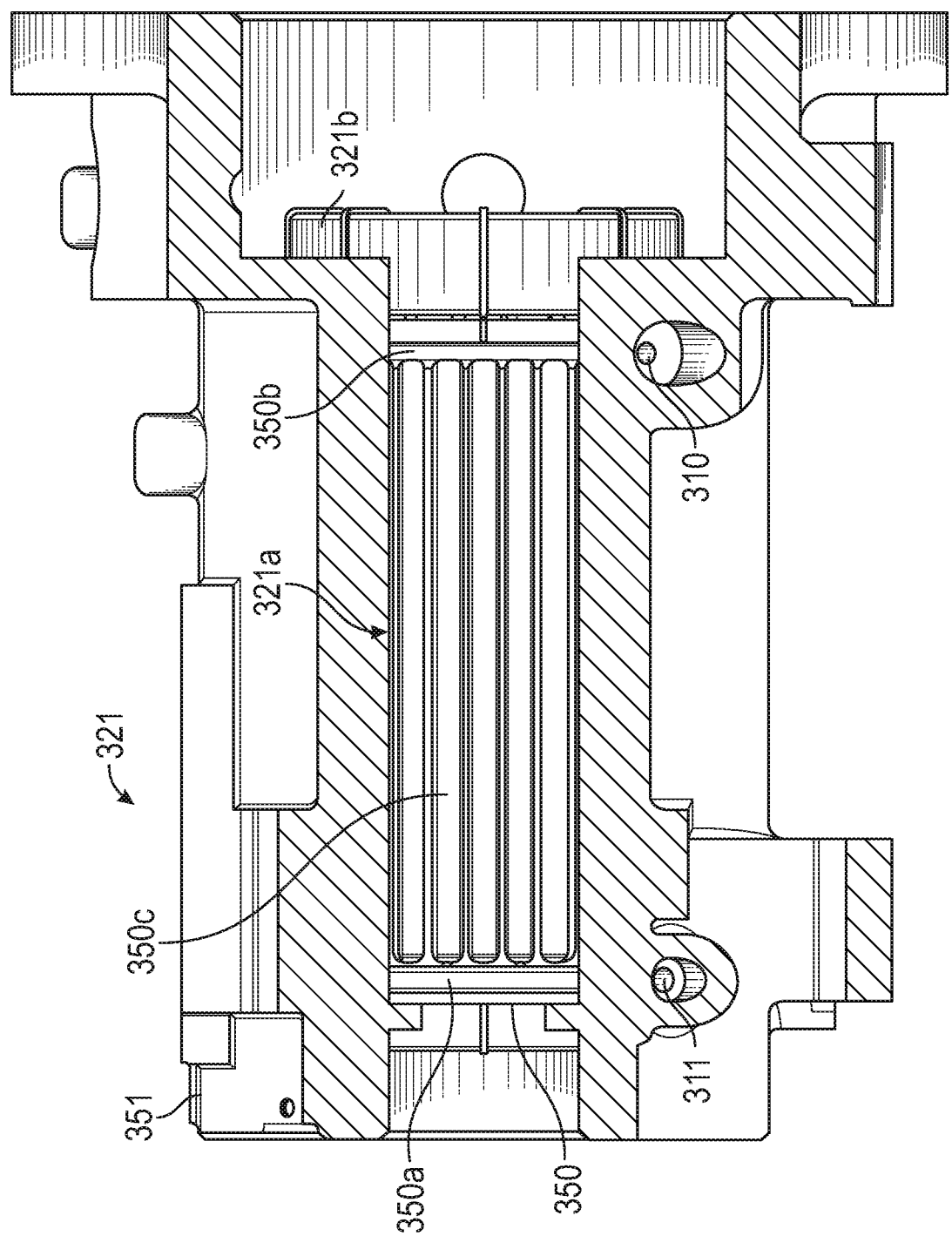
FIG. 3 is a side, planar view of a sleeve of a motor section of a vapor cycle compressor according to an embodiment of the present invention.

In FIG. 3, an exemplary motor section 321 with a cooling sleeve 350 is shown and may be similar to that described in relation to FIG. 2A. Accordingly, reference numbers in FIG. 3 correspond to like reference numbers in FIG. 2A.

According to embodiments, the motor section 321 may include a motor housing 351. The housing 351 may enclose a motor 321a having a stator 321b and a rotor therein (not shown). A cooling sleeve 350 can be disposed between the stator 321b and the housing 351.

Via a coolant inlet 311 in the housing 350, a refrigerant, such as the stator refrigerant, may flow to the cooling sleeve 350. The cooling sleeve 350 may initially receive the stator refrigerant at its inlet manifold 350a, flow the stator refrigerant through one or more of its coolant channels 350c, and discharge the stator refrigerant at its outlet manifold 350b. The discharged stator refrigerant may then exit the motor housing 351 via a coolant outlet 310 therein.

Figure 4A:
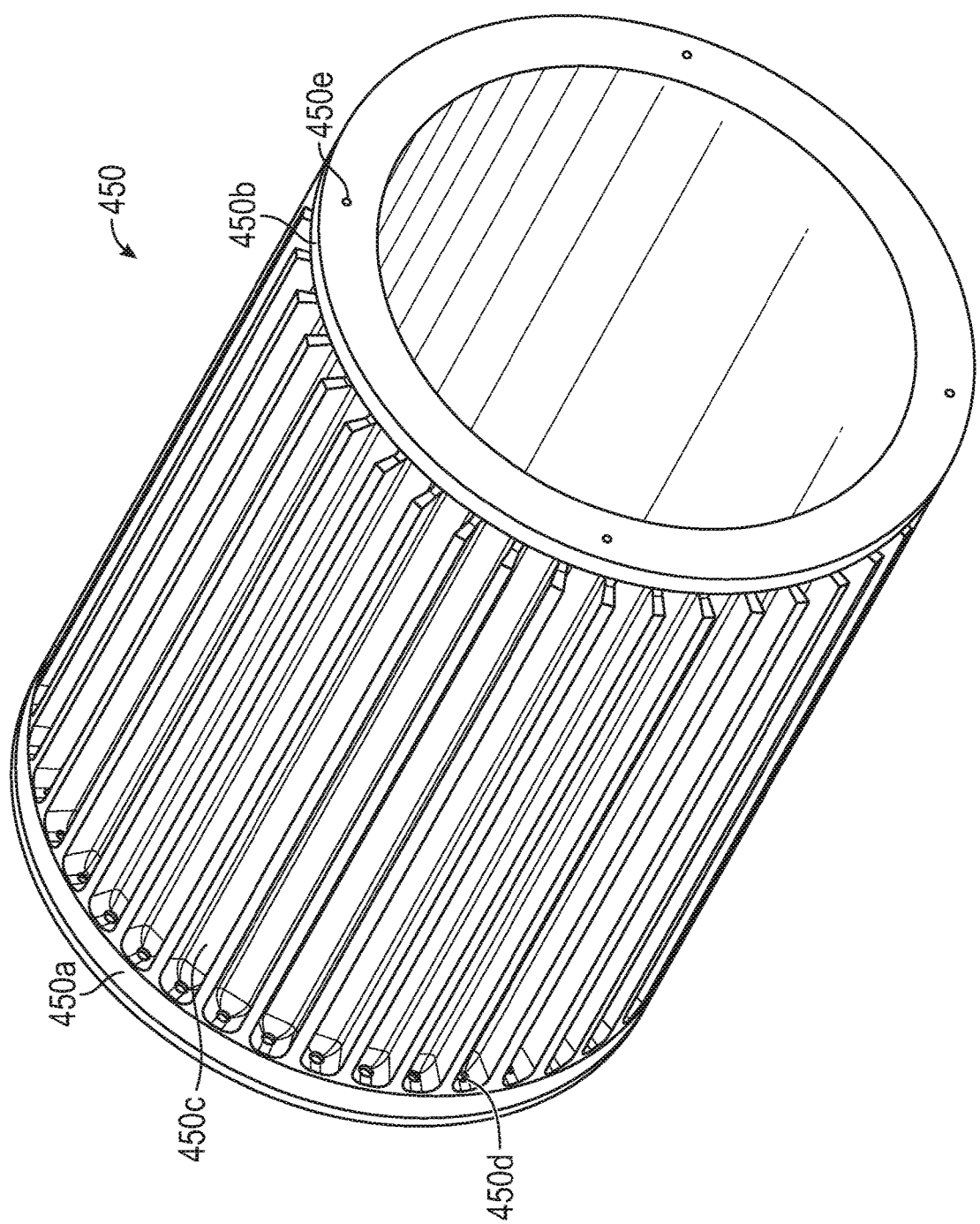
FIGS. 4A-4C are perspective views of a sleeve of a motor section of a vapor cycle compressor according to an embodiment of the present invention.
Figure 4B:
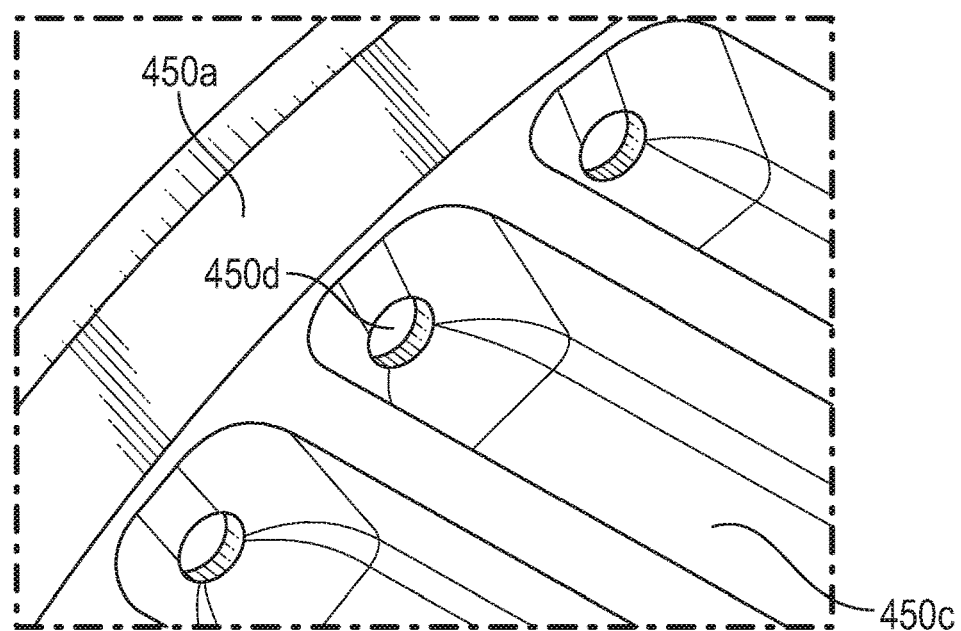
Figure 4C:
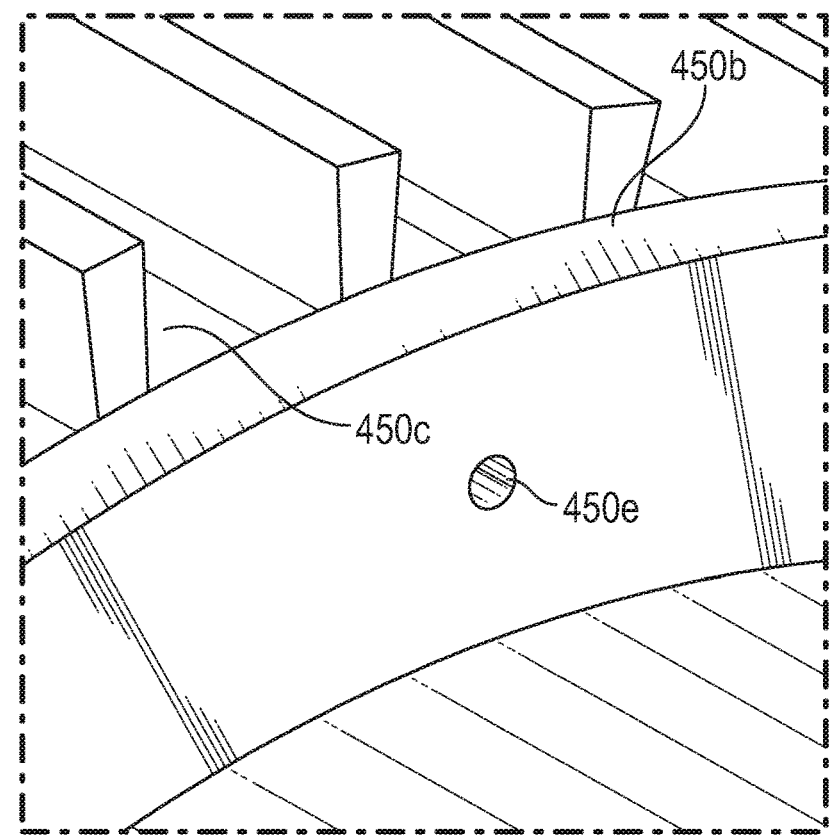

In FIGS. 4A-4C, an exemplary cooling sleeve 450 is shown and may be similar to that described in relation to FIG. 3. Accordingly, reference numbers in FIGS. 4A-4C correspond to like reference numbers in FIG. 3.

In FIG. 4A, the cooling sleeve 450 may include an inlet manifold 450a, and outlet manifold 450b, and one or more coolant channels 450c therebetween. The inlet manifold 450a may be configured with a void around a portion or all of the entire outer circumference of the sleeve 450 at one end thereof. The outlet manifold 450b may be configured with a void around a portion or all of the entire outer circumference of the sleeve 450 at an opposite end thereof. One or more of the coolant channels 450c may extend along and parallel to a longitudinal axis of the sleeve 450. Other channel configurations, such as spiral, are contemplated.

In FIG. 4B, the inlet manifold 450a may have one or more inlet holes 450d that communicate with one or more coolant channels 450c. Thereby, stator refrigerant can flow out of the inlet manifold 450a and into one or more of the channels 450c.

In FIG. 4C, the outlet manifold 450b may have one or more outlet holes 450e that communicate with one or more of the coolant channels 450c. Thereby, stator refrigerant can flow out of the outlet manifold 450b and into coolant outlet in the housing (FIG. 3).

It should be understood, of course, that the foregoing relates to exemplary embodiments of the invention and that modifications may be made without departing from the spirit and scope of the invention as set forth in the following claims.

We claim:

1. A vapor cycle compressor, comprising:
   a motor section that includes a motor housing enclosing a motor;
   a compression section operatively engaged with the motor section, wherein the compression section includes:
   a first compression stage comprising a first stage impeller assembly and a first stage diffuser assembly; and
   a second compression stage comprising a second stage impeller assembly and a second stage diffuser assembly;
   a controller section communicatively coupled with the motor, wherein the controller section is disposed on the motor housing;
   a refrigerant path in the motor section and in the compression section, wherein the refrigerant path includes:
   a compression refrigerant path, for a single phase compression refrigerant, in the compression section;
   an inner rotor shaft refrigerant path, for a single phase inner rotor shaft refrigerant, in the compression section and in the motor section;
   a stator refrigerant path, for a two phase stator refrigerant, in the motor section; and
   a cooling sleeve disposed between a stator of the motor and the motor housing, wherein the cooling sleeve at least partially defines the stator refrigerant path, and wherein the cooling sleeve is configured to cool the stator and the controller section,
   wherein a first portion of the inner rotor shaft refrigerant path in the motor section extends from between the first stage diffuser assembly and the second stage impeller assembly along an inner rotor shaft to an end of the inner rotor shaft opposite the compression section, and
   wherein a second portion of the inner rotor shaft refrigerant path in the compression section extends from between the first stage diffuser assembly and the second stage impeller assembly along the inner rotor shaft and exits the inner rotor shaft refrigerant path and passes around an outer annular extent of a thrust bearing disk to the stator refrigerant path.

2. The compressor of claim 1, wherein the compression refrigerant path extends through the first stage impeller assembly, the first stage diffuser assembly, a return channel assembly, the second stage impeller assembly, and the second stage diffuser assembly.

3. The compressor of claim 1, wherein the stator refrigerant path is configured to extend along and about the stator of the motor.

4. The compressor of claim 1, wherein the compression refrigerant path is in refrigerant communication with the inner rotor shaft refrigerant path.

5. A vapor cycle compressor, comprising:
a compression refrigerant path, for a first gas refrigerant, in a compression section of the compressor, wherein the compression section includes:
a first compression stage comprising a first stage impeller assembly and a first stage diffuser assembly; and
a second compression stage comprising a second stage impeller assembly and a second stage diffuser assembly;
an inner rotor shaft refrigerant path, for a second gas refrigerant, along an inner rotor shaft of the compressor;
a stator refrigerant path, for a gas and liquid refrigerant, in a motor section of the compressor, wherein the motor section includes a motor housing enclosing a motor; and
a cooling sleeve disposed between a stator of the motor and the motor housing, wherein the cooling sleeve at least partially defines the stator refrigerant path, wherein the cooling sleeve is configured to cool the stator and a controller section, wherein the controller section is communicatively coupled to the motor, and wherein the controller section is disposed on the motor housing,
wherein a first portion of the inner rotor shaft refrigerant path in the motor section extends from between the first stage diffuser assembly and the second stage impeller assembly along the inner rotor shaft to an end of the inner rotor shaft opposite the compression section, and
wherein a second portion of the inner rotor shaft refrigerant path in the compression section extends from between the first stage diffuser assembly and the second stage impeller assembly along the inner rotor shaft and exits the inner rotor shaft refrigerant path and passes and passes an outer annular extent of a thrust bearing disk to the stator refrigerant path.

6. The compressor of claim 5, wherein the compression section includes the inner rotor shaft, the first stage impeller assembly, the first stage diffuser assembly, a return channel assembly, the second stage impeller assembly, and the second stage diffuser assembly.

7. The compressor of claim 5, wherein the motor section includes the inner rotor shaft and the stator.

8. The compressor of claim 5, wherein the compression refrigerant path, the inner rotor shaft refrigerant path, and the stator refrigerant path form a continuous refrigerant path.

9. The compressor of claim 5, wherein the gas and liquid refrigerant includes the second gas refrigerant.

10. A vapor cycle compressor, comprising:
a compression refrigerant path, for a gas refrigerant, in a compression section of the compressor, wherein the compression section includes:
a first compression stage comprising a first stage impeller assembly and a first stage diffuser assembly; and
a second compression stage comprising a second stage impeller assembly and a second stage diffuser assembly;
an inner rotor shaft refrigerant path, for the gas refrigerant, about an inner rotor shaft of the compressor, wherein an outlet of the inner rotor shaft refrigerant path is in communication with the compression refrigerant path;
a stator refrigerant path, for a two phase refrigerant, about a stator of the compressor in a motor section of the compressor, wherein the motor section includes a motor housing enclosing the stator; and
a cooling sleeve disposed between the stator and the motor housing, wherein the cooling sleeve at least partially defines the stator refrigerant path, wherein the cooling sleeve is configured to cool the stator and a controller section, wherein the controller section is communicatively coupled to the stator, and wherein the controller section is disposed on the motor housing,
wherein a first portion of the inner rotor shaft refrigerant path in the motor section extends from between the first stage diffuser assembly and the second stage impeller assembly along the inner rotor shaft to an end of the inner rotor shaft opposite the compression section, and
wherein a second portion of the inner rotor shaft refrigerant path in the compression section extends from between the first stage diffuser assembly and the second stage impeller assembly along the inner rotor shaft and exits the inner rotor shaft refrigerant path and passes around an outer annular extent of a thrust bearing disk to the stator refrigerant path.

11. The compressor of claim 10, wherein the stator refrigerant path extends:
along and about the cooling sleeve, wherein the cooling sleeve surrounds the stator; and
in a gap between the stator and a rotor of the motor.

12. The compressor of claim 10, wherein the stator refrigerant path joins the inner rotor shaft refrigerant path in the motor housing of the compressor.

13. The compressor of claim 1, wherein the second portion of the inner rotor shaft refrigerant path joins the stator refrigerant path in the motor housing.

14. The compressor of claim 13,
wherein the compression refrigerant path is configured to:
receive, upstream of the first compression stage, a first portion of the compression refrigerant from an evaporator;
receive, upstream of the first compression stage, a second portion of the compression refrigerant from the stator refrigerant path;
receive, between the first and second compression stages, a third portion of the compression refrigerant from the stator refrigerant path via a subcooler;
discharge, downstream of the second compression stage, a fourth portion of the compression refrigerant to a condenser; and
discharge, between the first and second compression stages, a fifth portion of the compression refrigerant to the inner rotor shaft refrigerant path.

15. The compressor of claim 1, wherein the stator refrigerant path further comprises:
a first sub-path extending along the cooling sleeve; and
a second sub-path extending between the stator and a rotor of the motor,
wherein the inner rotor shaft refrigerant path joins the stator refrigerant path between the first sub-path and the second sub-path.

16. The compressor of claim 15,
wherein the inner rotor shaft refrigerant path is configured to:
receive, from the compression section between the first stage diffuser assembly and the second stage impeller assembly, the inner rotor shaft refrigerant from the compression refrigeration path;
discharge, to the compression section upstream of the first compression stage, a first portion of the inner rotor shaft refrigerant from the first portion of the inner rotor shaft refrigerant path; and discharge, to the stator refrigerant path between the first and second sub-paths, a second portion of the inner rotor shaft refrigerant from the second portion of the inner rotor shaft refrigerant path.

17. The compressor of claim 1,
wherein the stator refrigerant path is configured to discharge at least a portion of the stator refrigerant, via a subcooler, to the compression section between the first and second compression stages.

18. The compressor of claim 1, wherein the motor section and the controller section are hermetically sealed in a compressor housing.

* * * * *